United States Patent Office 3,098,831
Patented July 23, 1963

3,098,831
EXPANDED POLYETHYLENE AND METHOD OF MAKING THE SAME
Clide I. Carr, Wayne Township, Passaic County, N.J., assignor to United States Rubber Company, New York, N.Y., a corporation of New Jersey
No Drawing. Filed May 1, 1959, Ser. No. 810,252
5 Claims. (Cl. 260—2.5)

This invention relates to a novel expanded polyethylene material of exceptional properties, and also, it pertains to a method by which such a material is obtained.

In the course of my investigating how to produce an expanded polyethylene material for commercialization, many failures were encountered. In one method, linear polyethylene, which may be for the purpose of the present invention generic to straight chain and branched chain polymers, was blended with a rubber blowing agent and expanded in a closed mold, resulting in a product having a collapsed and non-uniform cellular structure. The method was modified by the inclusion of biurea or dibutyl phthalate, but there was no observable improvement on the cellular structure of the expanded product. The same method was repeated without the additives, with the exception that the expansion of the polyethylene was conducted in an open oven, but the results were essentially the same as those obtained by the use of a closed mold. In all of the above-mentioned experiments, the polyethylene starting material was in powder form and the blowing agent was admixed with it by milling. This procedure was varied by admixing the powdered polyethylene with the blowing agent without milling, and the total powdered mixture was expanded in a closed mold. The cell structure of the product thus obtained was even more collapsed than that of the products obtained by milling the starting materials. From the foregoing experiments it was felt that linear polyethylene was not suitable as a starting material to produce an acceptable expanded product, and that another starting material would be needed. Pursuant to that conclusion cross-linked polyethylene was employed as the starting material, but it did not work at all, because it was not possible to mix the polymer with the blowing agent to be used in the expansion treatment. After more investigation, it was eventually found that the starting material would have to be polyethylene substantially free of cross-linking for milling purposes and that the polyethylene should be cross-linked with the blowing agent contained therein.

Accordingly, an object of this invention is to provide an expanded polyethylene material which has a fine cellular structure and is capable of being used for various purposes including electrical insulation, weather-proofing or the like.

Another object is to provide a method by which expanded polyethylene of exceptional properties can be obtained.

Other objects and advantages of this invention will become apparent from the following description and explanation thereof.

It is contemplated by means of the present invention to provide an expanded polyethylene having a substantially uniform cellular structure, a density of not more than about 20 pounds per cubic foot, preferably about 2 to 10 pounds per cubic foot, at least about 75% of the pores having a maximum dimension of not greater than about 1 mm., usually less than about 0.5 mm., and at least about 10%, preferably at least about 50 to 75%, being cross-linked, on the basis of the percent of polyethylene being insoluble in toluene at 100° C. for 24 hours.

The expanded polyethylene is prepared by subjecting cross-linked polyethylene containing a rubber blowing agent to an elevated temperature at which the blowing agent is decomposed and thus causes the polyethylene to expand. The cross-linked polyethylene may be obtained by blending linear polyethylene with the rubber blowing agent and with or without a cross-linking agent, and then causing the polyethylene to cross-link without any significant effect on the rubber blowing agent.

The linear polyethylene which is used as a starting material is solid and may vary in number average molecular weight from about 10,000 to 100,000. Preferably, the crystallinity of the polyethylene does not exceed about 90%, and this value applies to the total starting material whether obtained from a single material or from a blend of material of 100% crystallinity and material of lower crystallinity. The type of starting material may also be identified by its ASTM melt index, and in this regard, the material preferably has a melt index of about .2 to 10.

The polyethylene in the form of a sheet or powder is admixed or blended with the compounding ingredients by heating to a temperature at which the polyethylene is plastic or workable and then milling the same. The temperature to which the polyethylene is heated is below the point at which the blowing agent decomposes significantly. Generally, the polyethylene is heated above its melting point, which may be for example 220° F., but below the point at which the polyethylene becomes substantially fluid or sticky. In general, the upper working temperature may be about 240–260° F. After heating the polyethylene and compounding ingredients together, homogeneity may be obtained by treatment in a Banbury mixer, a 2–3 roll mill, a calender or the like. Mixing may also be accomplished by extrusion of a mixture of polyethylene and the compounding ingredients. The polyethylene containing the compounding ingredients may be shaped to whatever form is desired prior to the cross-linking treatment.

The polyethylene starting material may be cross-linked by any conventional treatment. One method involves the use of a cross-linking agent such as an organic peroxide. The organic peroxide is incorporated into the linear polyethylene during the step in which the rubber blowing agent is added. The organic peroxides include various classes such as the alkyl peroxides, aralkyl peroxides, etc. These compounds preferably have a half-life of more than 5 minutes at 275° F. and less than 1 hour at 375° F. Specific examples of cross-linking agents are tertiary-butyl-perbenzoate, ditertiarybutyl peroxide, dicumyl peroxide, etc. The amount of agent used in the cross-linking reaction has an effect on the pore size of the cellular structure of the expanded product. Generally, an increase in amount of cross-linking agent decreases the pore size of the expanded product. In general, it has been found that about 0.002 to 0.01 mol of cross-linking agent per 100 grams of polyethylene are suitable for the purpose of this invention. Above the given range, there is a tendency for the cross-linking agent to interfere with the expansion of the polyethylene, consequently less desirable results are achieved. A lower amount of agent than in the stated range may be employed, but also with less satisfactory results.

The cross-linking treatment with the use of the chemical agent is conducted at an elevated temperature of about 275° to 400° F. The temperature of treatment is below the level at which significant decomposition of blowing agent occurs. The period of time allowed for cross-linking varies considerably, depending upon such factors as temperature, concentration of cross-linking agent, and the amount of cross-linking desired. In general, about 15 to 45 minutes are provided for the cross-linking treatment.

Another method by which cross-linking can be achieved is through the use of high energy ionizing radiation, and in such case, the polyethylene containing the blowing agent is subjected to the ionizing radiation. Any form of high energy ionizing radiation is suitable, including particulate or X-ray radiation, such as for example, high speed electrons, protons, neutrons, alpha particles, beta rays, etc. Generally, the radiation that may be employed should be such that the individual particles or photons thereof should possess energies of at least about 8 electron volts, usually for practical considerations about 100,000 to 10,000,000 electron volts, and the polyethylene is irradiated until at least about 2 watt hours per pound are absorbed, and the energy absorbed may vary as high as 20 watt hours per pound. Typical sources of ionizing radiation are electron accelerators of the Van de Graaff type, cobalt 60, nuclear reactors or the like.

In the next step, the polyethylene is expanded to produce the desired cellular structure. The cross-linked polyethylene contains the blowing agent for this purpose. The blowing agent is a conventional rubber blowing agent, which preferably decomposes with the liberation of gaseous material at a temperature of about 300° to 700° F., and so any person skilled in the art would readily appreciate the class of materials intended for use in this respect. Specific examples are dinitroso pentamethylene tetramine, sodium bicarbonate, azodicarbonamide, etc. At the temperature of decomposition of the blowing agent, gaseous material is liberated in sufficient quantity to expand the polyethylene and thus form the desired cellular structure. For the expansion step, it is preferred that the temperature be about 300° to 700° F., and in any case, it is above the temperature at which cross-linking by chemical means was effected. In general, expansion is conducted at a temperature at least about 20° F. higher than the decomposition temperature of the agent.

For the purpose of this invention about 2 to 15 parts by weight of blowing agent, based on 100 parts of the polyethylene material, are employed. The quantity of blowing agent may be varied outside the given range, but with less satisfactory results. At higher amounts of blowing agent less than optimum results are obtained, as manifested from the nature of the cellular structure of the product. Usually, about 2 to 15 minutes of expansion suffice to provide a fully expanded product; however, longer periods may be used where relatively large sizes are desired. The period of expansion may vary outside the given range, but the economics do not favor such a practice.

In order to provide a better understanding of this invention, reference will be had to the following specific examples.

100 parts by weight of polyethylene having a density of 0.92 gm./cc. in the form of a sheet and 8 parts by weight of azodicarbonamide (decomposition temperature 190° C.) were compounded on a 2 roll rubber mill maintained at a temperature of between 240–260° F. By this procedure a homogeneous sheet was obtained and subsequently a portion thereof was molded into plaques of 0.1″ to 0.25″ thickness at 260° F. for a 10-minute period. Thereafter, the plaques were exposed to high energy ionizing radiation from a 2 million volt Van de Graaff accelerator. The irradiated samples were then heated in air for 3 minutes at 450° F. The results obtained are reported in Table 1 below.

From the foregoing results it can be seen that remarkable effects are achieved by even small quantities of radiation. It can be noted that while sample B was irradiated to provide only 8% cross-linking, an appreciable cell structure was obtained, whereas sample A which was not cross-linked, contained no cellular structure. The importance of cross-linking the polyethylene starting material before expansion is clearly indicated by these results, especially in the case where expansion is to be conducted in an uncontrolled manner.

Another series of experiments were made in which 100 parts by weight of polyethylene having a density of 0.92 gm./cc. were compounded with 10 parts of azodicarbonamide and varying proportions of 40% dicumyl peroxide on a 2 roll rubber mill, maintained at a temperature of 240–260° F. Thereafter, the compounded polyethylene was molded into slabs and cross-linked by heating at 330° F. for 30 minutes. The samples were expanded by placing them in an air oven, maintained at a temperature of 450° F. for a period of 3 minutes. The results of these experiments are reported in Table 2 below.

*Table 2*

| Sample | I | J | K | L | M |
|---|---|---|---|---|---|
| Parts by weight of 40% dicumyl peroxide | 1 | 2 | 2.5 | 3 | 3.5 |
| Density | 4.3 | 4.4 | 4.6 | 4.7 | 6.1 |
| Appearance | Coarse | Fine | Increasing fineness ——→ | | |
| Compression modulus, p.s.i.: | | | | | |
| 12.5% | 7 | 7 | 8 | 11 | 15 |
| 25% | 11 | 11 | 13 | 17 | >17 |
| 24 hr. recovery of initial height regained after 25% compression | 95 | 96 | 96 | 93 | 98 |
| Linear shrinkage, percent: | | | | | |
| 150° F | <1 | <1 | <1 | <1 | <1 |
| 200° F | 1.3 | 3 | 2.2 | 1.3 | 5 |
| Percent insol. in 100° C. toluene after 24 hours | 9 | 70 | 77 | 83 | 86 |
| Swelling index | Dispersed | 27 | 18 | 14 | 12 |

One hundred parts of polyethylene having a density of 0.92 were mixed with varying amounts of azodicarbonamide and 40% dicumyl peroxide in accordance with the procedure employed in obtaining the data for Table 2 above. The results are reported in Table 3 below.

*Table 3*

| Sample | W | X | Y | Z | AA | BA | CA |
|---|---|---|---|---|---|---|---|
| Azodicarbonamide, parts by weight | 5 | 5 | 8 | 8 | 10 | 12 | 12 |
| 40% dicumyl peroxide, parts by weight | 1.5 | 2.0 | 1.5 | 2.0 | 2.5 | 1.5 | 2.0 |
| Density, lbs./cu. ft | 5.2 | 6.3 | 4.0 | 4.0 | 6.1 | 3.8 | 2.7 |
| Calc. dens.,[1] lb./cu. ft | 5.7 | 5.7 | 3.8 | 3.8 | 3.1 | 2.7 | 2.7 |
| Comp. mod., p.s.i.: | | | | | | | |
| 12.5% | 7 | 9 | 4 | 4 | 7.5 | 3 | 1.6 |
| 25% | 11 | 13 | 6 | 7 | 10.5 | 4 | 3 |
| Appearance | [2] C | [3] F | C | F | F | C | F |
| Linear shrinkage, percent: | | | | | | | |
| 150° F | (4) | (4) | (4) | (4) | (4) | (4) | (4) |
| 200° F | 2.7 | 4.2 | 4.3 | 6.0 | 5.5 | 4.0 | 6.5 |
| Percent closed cells | 92 | 100 | 88 | 91 | | | |
| Recovery after 25% compression, percent: | | | | | | | |
| ½ hr | 86 | 90 | 77 | 75 | 75 | 72 | 79 |
| 24 hrs | 93 | 95 | 94 | 90 | 89 | 84 | 89 |
| Percent insoluble in 100° C. toluene after 24 hours | 59 | 72 | 63 | 77 | 86 | 65 | 68 |
| Swelling index | 45 | 25 | 39 | 24 | 16 | 37 | 29 |

[1] Calculated on basis of 210 cc. nitrogen per gram Celogen AZ.
[2] Coarse.   [3] Fine.   [4] Not over 1 percent.

*Table 1*

| Sample | A | B | C | D | E | F | G | H |
|---|---|---|---|---|---|---|---|---|
| Irradiation, watt hrs./lb | 0 | 2 | 4 | 6 | 8 | 12 | 16 | 20 |
| Density, lbs./cu. ft | | 8.7 | 7.1 | 4.8 | 5.2 | 7.7 | 8.1 | 16 |
| Appearance of cell structure | Collapsed | Coarse | Fine | Increasing fineness ——→ | | | | |
| Percent insoluble in 100% toluene after 24 hours | 0 | 8 | 25 | 32 | 53 | 72 | 72 | |
| Swelling index (ratio of swollen weight in toluene to dried weight of swollen gel) | Dispersed | Dispersed | High | 65 | 28 | 13 | 11.8 | |

From the above table it can be seen that the expanded product is composed essentially of closed cellular structure and that the extent of cross-linking determines whether the product has a fine or coarse cellular structure.

Another series of experiments were performed in which various types of polyethylene were employed as starting materials, following the procedure employed in obtaining the data for Table 2.

Table 4

| Sample | DA | EA | FA | GA |
|---|---|---|---|---|
| Parts of polyethylene [1] | 75 | 50 | 25 | |
| Do.[2] | | | | 100 |
| Do.[3] | 25 | 50 | 75 | |
| Parts of azodithiocarbamide | 10 | 10 | 10 | 10 |
| Parts of 40% dicumyl peroxide | 1.5 | 1.5 | 1.5 | 1.5 |
| Density, lb./cu. ft | 4.0 | 4.2 | 5.5 | 4.2 |
| Cell structure | Fine | Fine | Fine | Fine |

[1] A linear, high density (0.96 polyethylene with melt index of 0.2 and 93–95% crystalline material.
[2] A linear, high density (0.95–0.97) medium molecular weight polyethylene with melt index of 1–3 and 85–90% crystalline material.
[3] A regular, low density (0.92) polyethylene with melt index of 0.3–0.5 and 20–30% crystalline material.

It was noted from the experiments reported in Table 4 that the straight chain polyethylenes having high densities gave products which were stiffer than the regular polyethylene or the one having more branching in the polymer molecule.

In the following experiments, 100 parts of polyethylene having a molecular weight of 15,000 and the melt index of 2.5 to 3.6 were mixed with ten parts of azodicarbonamide and treated in accordance with the procedure employed to obtain the data in Table 2.

Table 5

| Sample | HA | IA | JA | KA |
|---|---|---|---|---|
| Irradiation, watt hr./lb | 2 | 4 | 8 | |
| Dicumyl peroxide, parts by weight | | | | 2.5 |
| Density, lbs./ft.[3] | 3.7 | 3.7 | 3.9 | 5.1 |
| Appearance | Coarse | Fine | Fine | Fine |

It was also found that a mixture of the polyethylene used in Table 5 and a still lower molecular weight polyethylene (1000–4000) gave a satisfactory product.

In the next series of experiments, one hundred parts of polyethylene having a density of 0.92 were mixed with various blowing agents and treated in accordance with the procedure described in connection with Table 1. The results are reported in Table 6 below.

Table 6

| Blowing agent | Decomp. temp., °C. | Parts | Temp. of heating, °F. |
|---|---|---|---|
| A | 90 | 10 | 450 |
| B | 150–200 | 14 | 450 |
| B | 150–200 | 14 | 350 |
| C | 150 | 14 | 450 |
| D | 160–175 | 12 | 450 |
| D | 160–175 | 12 | 350 |

Note.—A = Azodicarbonamide; B = Dinitroso pentamethylene tetramine; C = Sodium bicarbonate in mineral oil; D = 8 parts A plus 4 parts zinc oxide.

In every experiment reported in Table 6, a satisfactory product was obtained.

Additionally, a series of experiments were made using t-butyl perbenzoate, and ditertiary butyl peroxide as the cross-linking agents in a molar amount equivalent to 2 parts by weight of 40% dicumyl peroxide, 10 parts of azodicarbonamide and 100 parts of polyethylene having a density of 0.92. Following the procedure described in connection with Table 2, good results were obtained.

Another series of experiments were conducted to determine the effect of various modifiers on the expanded product. For these runs, 100 parts of polyethylene having a density of 0.92 and melt index 0.3 to 0.5, 10 parts of azodicarbonamide and either 20 parts of GR-S rubber powder or 15 parts of powdered carbon black were thoroughly mixed on a two-stage roll mill. The runs were conducted following the procedure described in connection with Table 1.

Table 7

| Sample | MA | NA | OA | PA | CA | RA | SA |
|---|---|---|---|---|---|---|---|
| GR-S | 20 | 20 | 20 | 20 | | | |
| Philblack O (carbon black) | | | | | 15 | 15 | 15 |
| Rad. dosg | 4 | 8 | 12 | 16 | 4 | 8 | 12 |
| Density | 4.2 | | 3.5 | | 5.7 | 6.0 | 6.3 |
| Appearance | Coarse | Fine | Fine | | ([1]) | ([1]) | ([1]) |
| Compression modulus, p.s.i.: | | | | | | | |
| 12.5% | 3.3 | 4.0 | 3.5 | 4.3 | 4.2 | 10 | 10 |
| 25% | 4.7 | 7.0 | 6 | 7.0 | 7.3 | >20 | >20 |
| Percent recovery in ½ hour after 25% compression | 83 | 81 | 73 | 77 | 79 | 91 | 85 |
| Percent recovery in 24 hours | 98 | 91 | 86 | 93 | 92 | 97 | 95 |

[1] Fine cell.

The results in Table 7 show that GR-S rubber yields a softer product, and that carbon black reduces the quantity of radiation needed for cross-linking and yields products having much higher compression moduli. Although not shown in Table 7, polystyrene was also tried as a modifier and it gave a satisfactory low density expanded product.

In the next experiments, polyethylene in powdered and sheet form was used as the starting material, and the product was obtained by expansion in a closed mold and in an open oven. The procedure described in connection with Table 1 was followed in all other respects.

Table 8

| Sample | TA | UA | WA | XA |
|---|---|---|---|---|
| Polyethylene sheet, parts by weight | 100 | 100 | | |
| Powdered polyethylene | | | 100 | 100 |
| Azodicarbonamide | 10 | 10 | 10 | 10 |
| 40% dicumyl peroxide | 2 | 2 | 2 | 2 |
| Mold type | Open | Clo. | Clo. | Clo. |
| Expansion allowed | | 7.8/1 | 7.8/1 | 3.9/1 |
| Blowing satisfactory? | Yes | Yes | Yes | ([1]) |
| Appearance of cells | Fine | Fine | Fine | |
| More than 60% insoluble in 100° C. toluene after 24 hours | Yes | Yes | Yes | Yes |

[1] Did not fill mold.

It can be seen that satisfactory products are obtained whether sheet or powdered polyethylene is used, and that an open or closed system produces good results alike.

From the foregoing data, various conclusions can be drawn regarding the expanded product. The closed cellular structure of fine pore size provides a pleasing appearance and is pleasant to the touch. The relatively low density of the product is an advantage because less polyethylene per unit volume is employed and this is accomplished with excellent improvement in both thermal and electrical insulation properties. The closed structure of the product renders it especially suitable for use in contact with water, because it has relatively low absorptive power therefor. The expanded product has excellent dimensional stability at a temperature of about 195–200° F. as compared with conventional expanded straight chain or branched polyethylene. The recovery of the present expanded product is significantly better than conventional expanded straight chain or branched polyethylene, indicating that the present material is excellent for use as a weather-proofing material, padding for doors, soles for shoes, shock absorbers and many similar uses. Similarly, the wear resistance of the present product is significantly better than that of expanded linear or branched polyethylene. The resilience of the present material is also excellent.

Having thus provided a description of this invention along with specific examples thereof, the invention is defined by the appended claims.

I claim:
1. The process which comprises subjecting a solid polyethylene material containing (1) an effective amount of an organic peroxide having a half-life of more than 5 minutes at 275° F. and less than one hour at 375° F., and (2) a solid rubber blowing agent which decomposes with liberation of gas at a temperature of about 300° to 700° F., to a temperature at which the polyethylene becomes structurally transformed so that at least 10% of the polyethylene is insoluble when maintained in toluene at 100° C. for 24 hours and below that at which significant decomposition of the blowing agent occurs, and then subjecting the transformed product to a higher temperature at which the blowing agent decomposes and thereby causing the polyethylene to expand.

2. The process of claim 1 wherein the blowing agent is selected from the group consisting of dinitroso pentamethylene tetramine, sodium bicarbonate and azodicarbonamide.

3. The process which comprises subjecting a solid polyethylene material having not more than 90% crystallinity and containing, per 100 parts of polyethylene, (1) about 2 to 15 parts of solid blowing agent which decomposes with liberation of gas at a temperature of about 300° to 700° F., and (2) about 0.002 to 0.01 mol of organic peroxide having a half-life of more than 5 minutes at 275° F. and less than one hour at 375° F., to a temperature within the range of about 275° to 400° F. and at which the polyethylene is structurally transformed so that at least 50% of the polyethylene is insoluble when maintained in toluene at 100° C. for 24 hours and below that at which significant decomposition of the blowing agent occurs and then subjecting the transformed product to a higher temperature within the range of about 300° to 700° F. and thereby causing the blowing agent to decompose and the polyethylene to expand.

4. The process of claim 3 wherein the organic peroxide is selected from the group consisting of alkyl peroxides and aralkyl peroxides and the blowing agent is selected from the group consisting of azodicarbonamide, sodium bicarbonate and dinitroso pentamethylene tetramine.

5. The process of claim 3 wherein the organic peroxide is dicumyl peroxide and the blowing agent is azodicarbonamide.

References Cited in the file of this patent
UNITED STATES PATENTS

| | | |
|---|---|---|
| 2,256,483 | Johnston | Sept. 23, 1941 |
| 2,528,523 | Kent | Nov. 7, 1950 |
| 2,628,945 | Wayne | Feb. 17, 1953 |
| 2,888,424 | Precopio et al. | May 26, 1959 |
| 2,948,664 | Rubens et al. | Aug. 9, 1960 |